(12) United States Patent
Wei et al.

(10) Patent No.: US 12,425,899 B2
(45) Date of Patent: *Sep. 23, 2025

(54) PERIODIC AND APERIODIC CHANNEL STATE INFORMATION (CSI) REPORTING FOR MIMO

(71) Applicant: QUALCOMM Incorporated, San Diego, CA (US)

(72) Inventors: Chao Wei, Beijing (CN); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,050

(22) Filed: Apr. 21, 2022

(65) Prior Publication Data

US 2022/0248247 A1     Aug. 4, 2022

Related U.S. Application Data

(63) Continuation of application No. 15/313,003, filed as application No. PCT/CN2014/078097 on May 22, 2014, now Pat. No. 11,317,306.

(51) Int. Cl.
*H04W 24/10* (2009.01)
*H04B 7/0456* (2017.01)
(Continued)

(52) U.S. Cl.
CPC .......... *H04W 24/10* (2013.01); *H04B 7/0469* (2013.01); *H04B 7/0478* (2013.01);
(Continued)

(58) Field of Classification Search
CPC ............. H04W 24/10; H04W 72/0413; H04W 72/085; H04W 88/08; H04B 7/0626;
(Continued)

(56) References Cited

U.S. PATENT DOCUMENTS 7,721,291 B2    5/2010   Mckenney et al.
8,732,711 B2    5/2014   Dally et al.
(Continued)

FOREIGN PATENT DOCUMENTS

CN    102082636 A    6/2011
CN    102377469 A    3/2012
(Continued)

OTHER PUBLICATIONS

3GPP TS 36.213: "3rd Generation Partnership Project; Technical Specification Group Radio Access Network; Evolved Universal Terrestrial Radio Access (E-UTRA); Physical layer procedures (Release 12)", V12.1.0 (Mar. 2014), Mar. 21, 2014, pp. 1-186, URL: http://www.3gpp.org/ftp/Specs/archive/36_series/36.213/36213-c10.zip and https://itectec.com/archive/3gpp-specification-ts-36-213/.
(Continued)

*Primary Examiner* — Chi Tang P Cheng
(74) *Attorney, Agent, or Firm* — Patterson + Sheridan, L.L.P.

(57) ABSTRACT

Certain aspects of the present disclosure provide techniques for performing periodic and aperiodic CSI reporting for MIMO operations. According to certain aspects, operations for performing periodic and aperiodic CSI reporting for MIMO generally includes configuring a user equipment (UE) that is capable of MIMO with different parameters for periodic and aperiodic channel state information (CSI) reporting, wherein the different parameters indicate at least one of what resources to measure or what information to report, and receiving periodic and aperiodic CSI reporting from the UE according to the configuration.

30 Claims, 13 Drawing Sheets

(51) Int. Cl.
*H04B 7/06* (2006.01)
*H04L 1/00* (2006.01)
*H04L 5/00* (2006.01)
*H04W 72/21* (2023.01)
*H04W 72/542* (2023.01)
*H04B 7/0452* (2017.01)
*H04W 88/08* (2009.01)

(52) U.S. Cl.
CPC ......... *H04B 7/0626* (2013.01); *H04B 7/0639* (2013.01); *H04B 7/0647* (2013.01); *H04B 7/0691* (2013.01); *H04L 1/0026* (2013.01); *H04L 5/0023* (2013.01); *H04L 5/0028* (2013.01); *H04L 5/0057* (2013.01); *H04L 5/0085* (2013.01); *H04W 72/21* (2023.01); *H04W 72/542* (2023.01); *H04B 7/0452* (2013.01); *H04L 1/0027* (2013.01); *H04L 1/0029* (2013.01); *H04L 5/006* (2013.01); *H04L 5/0082* (2013.01); *H04W 88/08* (2013.01)

(58) Field of Classification Search
CPC .. H04B 7/0639; H04B 7/0469; H04B 7/0478; H04B 7/0647; H04B 7/0691; H04B 7/0452; H04L 5/0023; H04L 5/0057; H04L 5/0085; H04L 5/0028; H04L 5/006; H04L 5/0082; H04L 1/0026; H04L 1/0027; H04L 1/0029
USPC ........................................................ 370/252
See application file for complete search history.

(56) References Cited

U.S. PATENT DOCUMENTS

| | | | |
|---|---|---|---|
| 8,732,713 B2 | 5/2014 | Coon et al. | |
| 8,995,400 B2 | 3/2015 | Geirhofer et al. | |
| 9,083,501 B2 | 7/2015 | Luo et al. | |
| 9,209,950 B2 | 12/2015 | Luo et al. | |
| 9,515,773 B2 | 12/2016 | Barbieri et al. | |
| 9,572,063 B2 | 2/2017 | Etemad et al. | |
| 9,596,065 B2 | 3/2017 | Chen et al. | |
| 9,681,425 B2 | 6/2017 | Geirhofer et al. | |
| 2011/0141928 A1 | 6/2011 | Shin et al. | |
| 2012/0127869 A1 | 5/2012 | Yin et al. | |
| 2012/0275398 A1 | 11/2012 | Chen et al. | |
| 2014/0003240 A1 | 1/2014 | Chen et al. | |
| 2014/0098689 A1* | 4/2014 | Lee | H04W 24/08 370/252 |
| 2014/0313912 A1* | 10/2014 | Jongren | H04L 1/0026 370/252 |
| 2014/0341048 A1 | 11/2014 | Sajadieh et al. | |
| 2014/0376485 A1* | 12/2014 | Lee | H04L 5/0053 370/329 |
| 2015/0003271 A1 | 1/2015 | Park et al. | |
| 2015/0113538 A1 | 4/2015 | Giroux et al. | |
| 2015/0146558 A1* | 5/2015 | Yi | H04L 5/0057 370/252 |
| 2015/0162966 A1 | 6/2015 | Kim et al. | |
| 2016/0350159 A1 | 12/2016 | Mealey et al. | |
| 2017/0164226 A1 | 6/2017 | Wei et al. | |
| 2017/0303267 A1* | 10/2017 | Shin | H04L 1/0028 |

FOREIGN PATENT DOCUMENTS

| | | |
|---|---|---|
| CN | 102870362 A | 1/2013 |
| JP | 2011015394 A | 1/2011 |
| JP | 2013531905 A | 8/2013 |
| KR | 20090076784 A | 9/2009 |
| KR | 20150080523 A | 7/2015 |
| WO | 2011127092 | 10/2011 |
| WO | 2011127098 A1 | 10/2011 |
| WO | 2011130393 | 10/2011 |
| WO | 2013144360 A1 | 10/2013 |
| WO | 2013183946 A1 | 12/2013 |
| WO | 2014065850 A1 | 5/2014 |

OTHER PUBLICATIONS

International Search Report and Written Opinion—PCT/CN2014/078097—ISA/EPO—Mar. 2, 2015.
Supplementary European Search Report—EP14892803—Search Authority—The Hague—Nov. 29, 2017.
International Preliminary Report on Patentability—PCT/CN2014/078097, International Search Authority—European Patent Office, Dec. 1, 2016.

* cited by examiner

```
CSI-RS-ConfigNZP-r11 ::=        SEQUENCE {
    csi-RS-IdentityNZP-r11          CSI-RS-IdentityNZP-r11,
    antennaPortsCount-r11           ENUMERATED {an1, an2, an4, an8},
    resourceConfig-r11              INTEGER (0..31),
    subframeConfig-r11              INTEGER (0..154),
    scramblingIdentity-r11          INTEGER (0..503),
    qcl-CRS-Info-r11                SEQUENCE {
        qcl-ScramblingIdentity-r11      INTEGER (0..503),
        crs-PortsCount-r11              ENUMERATED {n1, n2, n4, spare1},
        mbsfn-SubframeConfig-r11        MBSFN-SubframeConfig            OPTIONAL     -- Need OR
                                                                        OPTIONAL,    -- Need OR
    }
    ...
}
```

FIG. 12

```
CSI-RS-ConfigNZP-r13 ::=        SEQUENCE {
    csi-RS-IdentityNZP-r11          CSI-RS-IdentityNZP-r11,
    antennaPortsCount-r11           ENUMERATED {an1, an2, an4, an8},
    resourceConfig-r11              INTEGER (0..31),
    subframeConfig-r11              INTEGER (0..154),
    antennaPortsCount-v13x0         ENUMERATED {an1, an2, an4, an8},    OPTIONAL     -- Need OR
    resourceConfig-v13x0            INTEGER (0..31),                    OPTIONAL     -- Need OR
    subframeConfig-v13x0            INTEGER (0..154),                   OPTIONAL     -- Need OR
    scramblingIdentity-r11          INTEGER (0..503),
    qcl-CRS-Info-r11                SEQUENCE {
        qcl-ScramblingIdentity-r11      INTEGER (0..503),
        crs-PortsCount-r11              ENUMERATED {n1, n2, n4, spare1},
        mbsfn-SubframeConfig-r11        MBSFN-SubframeConfig            OPTIONAL     -- Need OR
                                                                        OPTIONAL,    -- Need OR
    }
    ...
}
```

FIG. 13

```
CSI-Process-r13 ::=     SEQUENCE {
    csi-ProcessIdentity-r11         CSI-ProcessIdentity-r11,
    csi-RS-IdentityNZP-r11          CSI-RS-IdentityNZP-r11,
    csi-RS-IdentityNZP-v13x0        CSI-RS-IdentityNZP-r11,         OPTIONAL,       -- Need OR
    csi-IM-Identity-r11             CSI-IM-Identity-r11,
    p-C-AndAntennaInfoDedList-r11   SEQUENCE (SIZE (1..2)) OF P-C-AndAntennaInfoDed-r11,
    cqi-ReportBothPS-r11            CQI-ReportBothPS-r11            OPTIONAL,       -- Need OR
    cqi-ReportPeriodicId-r11        INTEGER (0..maxCQI-Ext-r11)     OPTIONAL,       -- Need OR
    cqi-ReportAperiodicPS-r11       CQI-ReportAperiodicPS-r11       OPTIONAL,       -- Need OR
    ...
}
```

FIG. 14

PERIODIC AND APERIODIC CHANNEL STATE INFORMATION (CSI) REPORTING FOR MIMO

CROSS-REFERENCE TO RELATED APPLICATIONS

This application is a continuation of U.S. patent application Ser. No. 15/313,003, entitled "Periodic and Aperiodic Channel State Information (CSI) Reporting for MIMO," and filed Nov. 21, 2016, which is a national phase entry under 35 U.S.C. § 371 of PCT Application Serial No. PCT/CN2014/078097, entitled "Periodic and Aperiodic Channel State Information (CSI) Reporting for MIMO," and filed May 22, 2014, both of which are assigned to the assignee hereof, and both of which are hereby incorporated by reference in their entirety.

BACKGROUND

I. Field

Certain aspects of the disclosure generally relate to wireless communications and, more particularly, to techniques for configuring multiple-input multiple-output (MIMO) channel state information (CSI) feedback for periodic and aperiodic reporting.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

Certain aspects of the disclosure provide techniques for reporting multiple-input multiple-output (MIMO) channel state information (CSI) feedback based on different parameters for periodic and aperiodic CSI reporting.

Certain aspects of the present disclosure provide a method for wireless communications by a base station (BS). The method generally includes configuring a user equipment (UE) that is capable of MIMO with different parameters for periodic and aperiodic channel state information (CSI) reporting, wherein the different parameters indicate at least one of what resources to measure or what information to report; and receiving periodic and aperiodic CSI reporting from the UE according to the configuration.

Certain aspects of the present disclosure provide a method for wireless communications by a MIMO-capable user equipment (UE). The method generally includes receiving a configuration, from a base station, of different parameters for periodic and aperiodic channel state information (CSI) reporting, wherein the different parameters indicate at least one of what resources to measure or what information to report; and measuring and reporting periodic and aperiodic CSI according to the configuration.

Aspects of the present disclosure also include various apparatus and program products for performing operations in accordance with the methods described above.

BRIEF DESCRIPTION OF THE DRAWINGS

FIGS. 12-14 illustrate an example structure definitions for configuring resources for CSI reporting, in accordance with certain aspects of the present disclosure.

DETAILED DESCRIPTION

Certain aspects of the disclosure provide techniques for configuring different parameters for periodic and aperiodic multiple-input multiple-output (MIMO) channel state information (CSI) feedback, which may reduce feedback overhead for CSI reporting.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

An Example Wireless Communications Network

Figure 1:
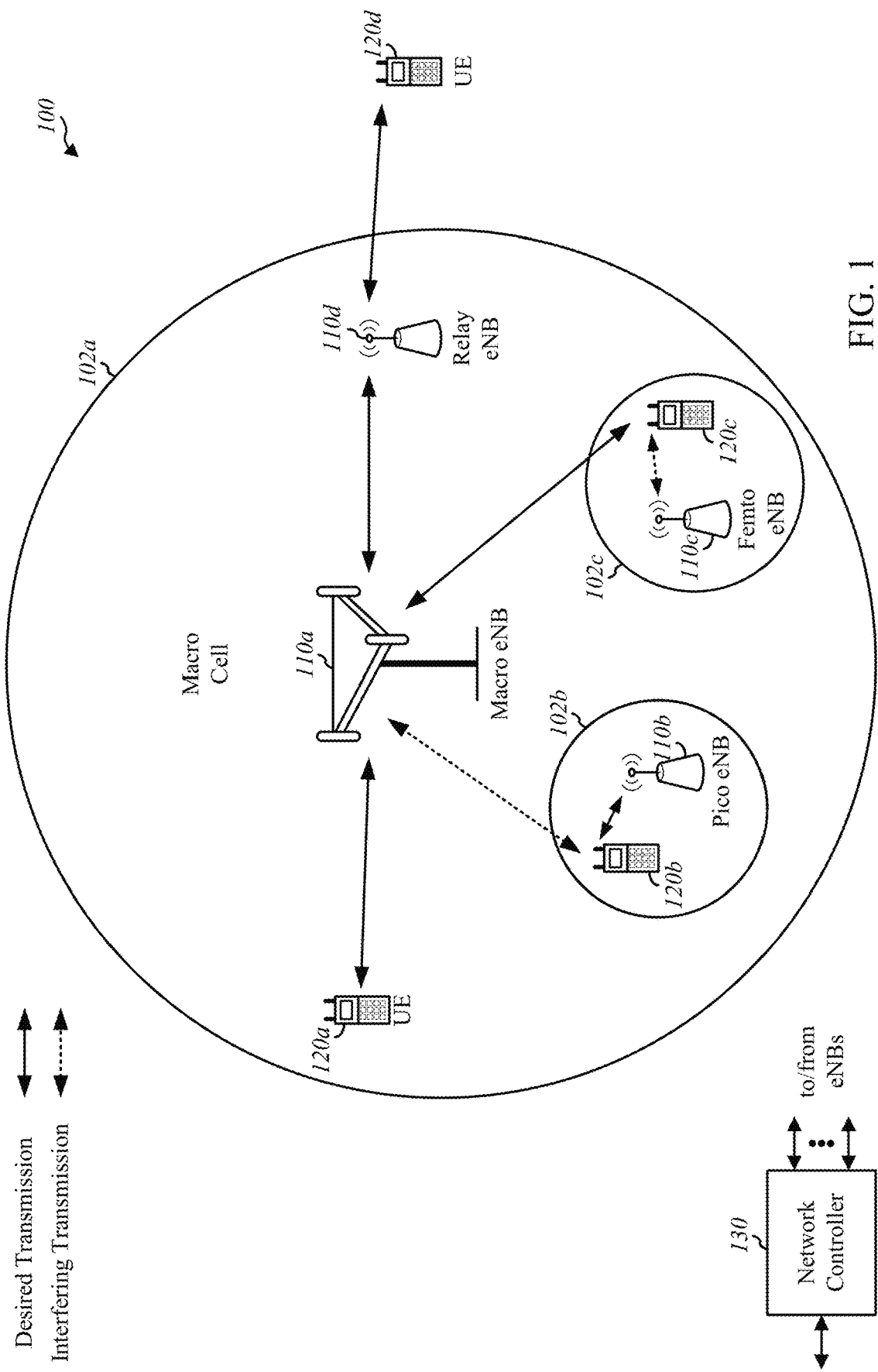
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
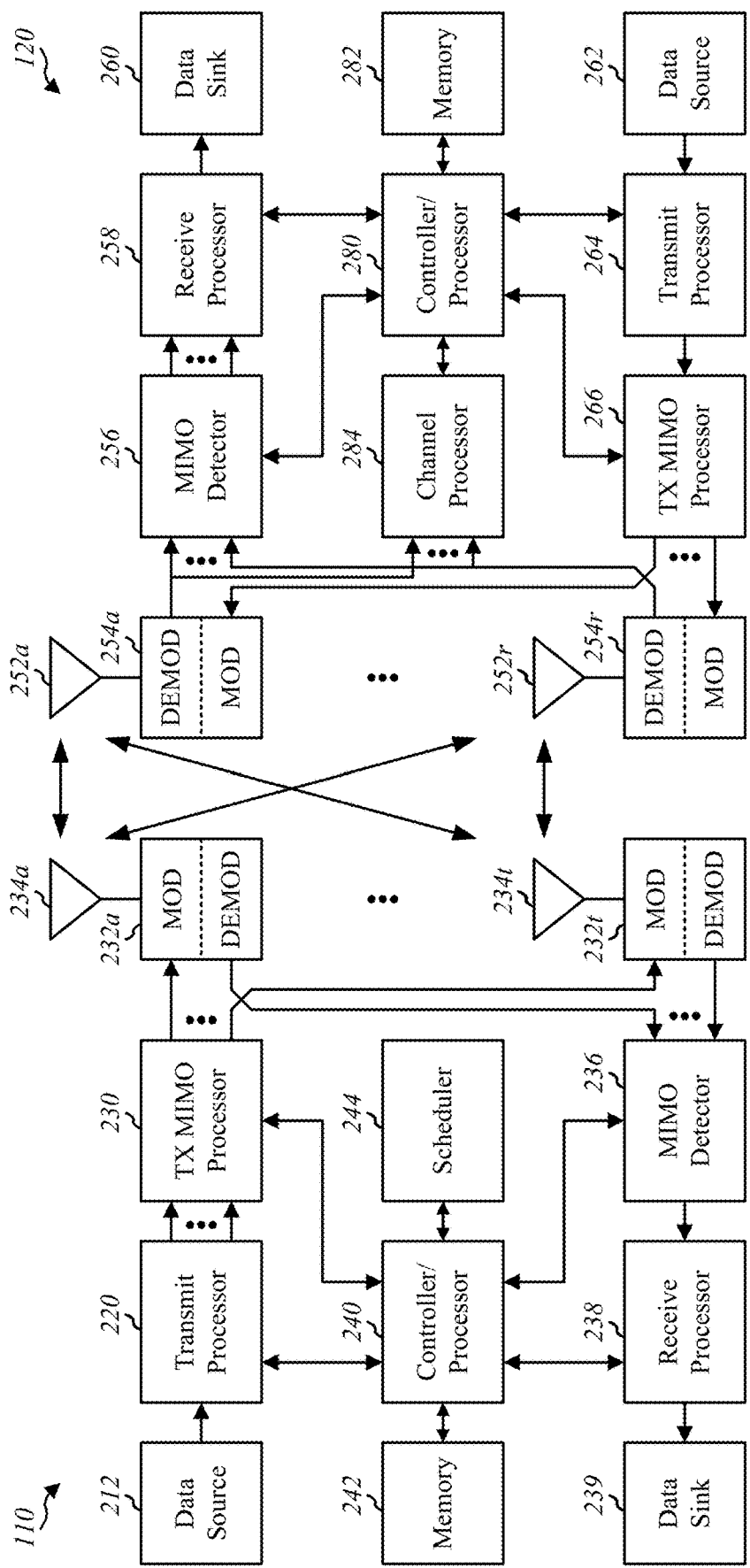
FIG. 2 is a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T 1 and R$^1$.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols using the PMI (Precoding Matrix Indicator) feedback from the UE, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

As will be described in further detail below, when transmitting data to the UE 120 the base station 110 may be configured to determining a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
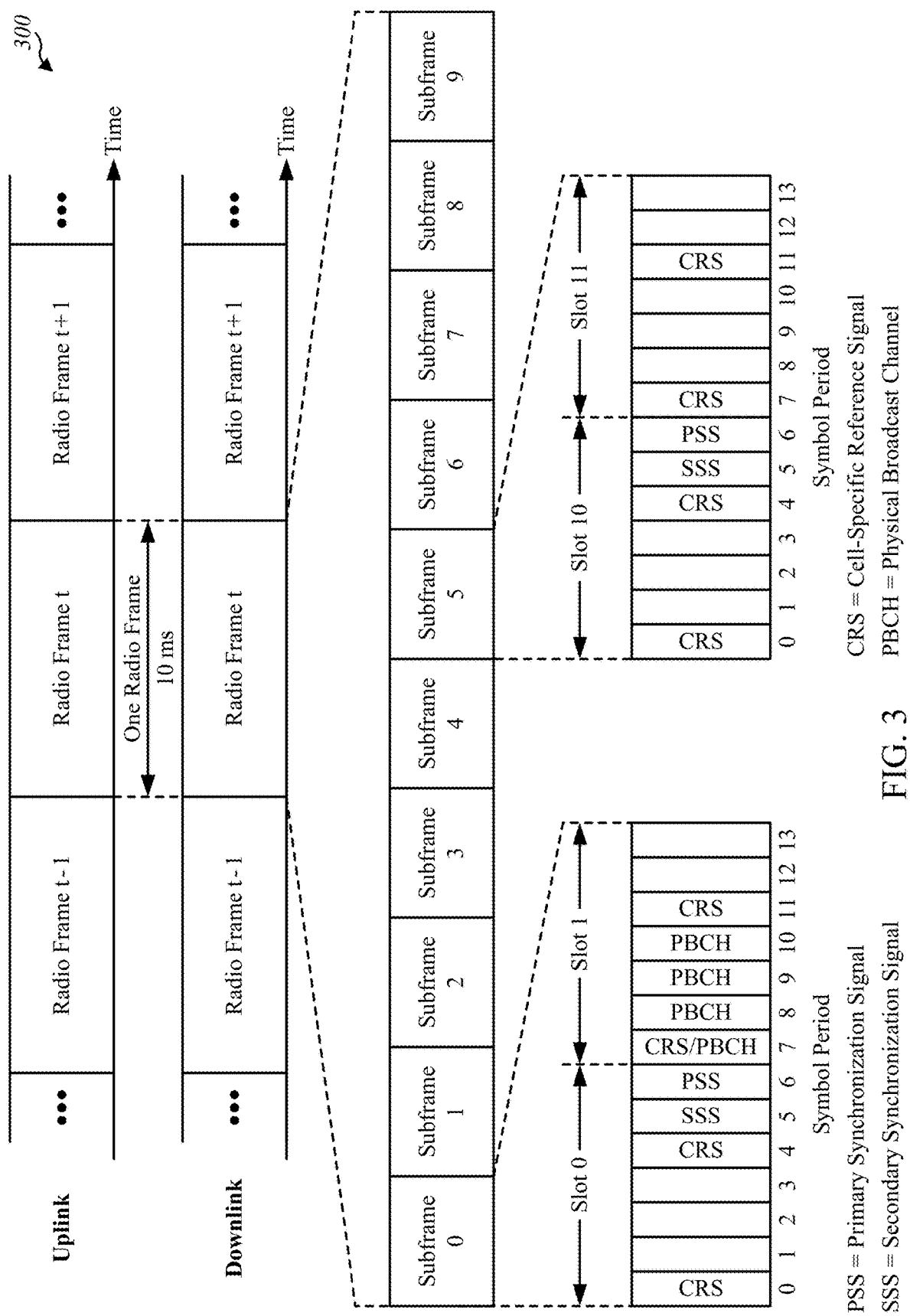
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
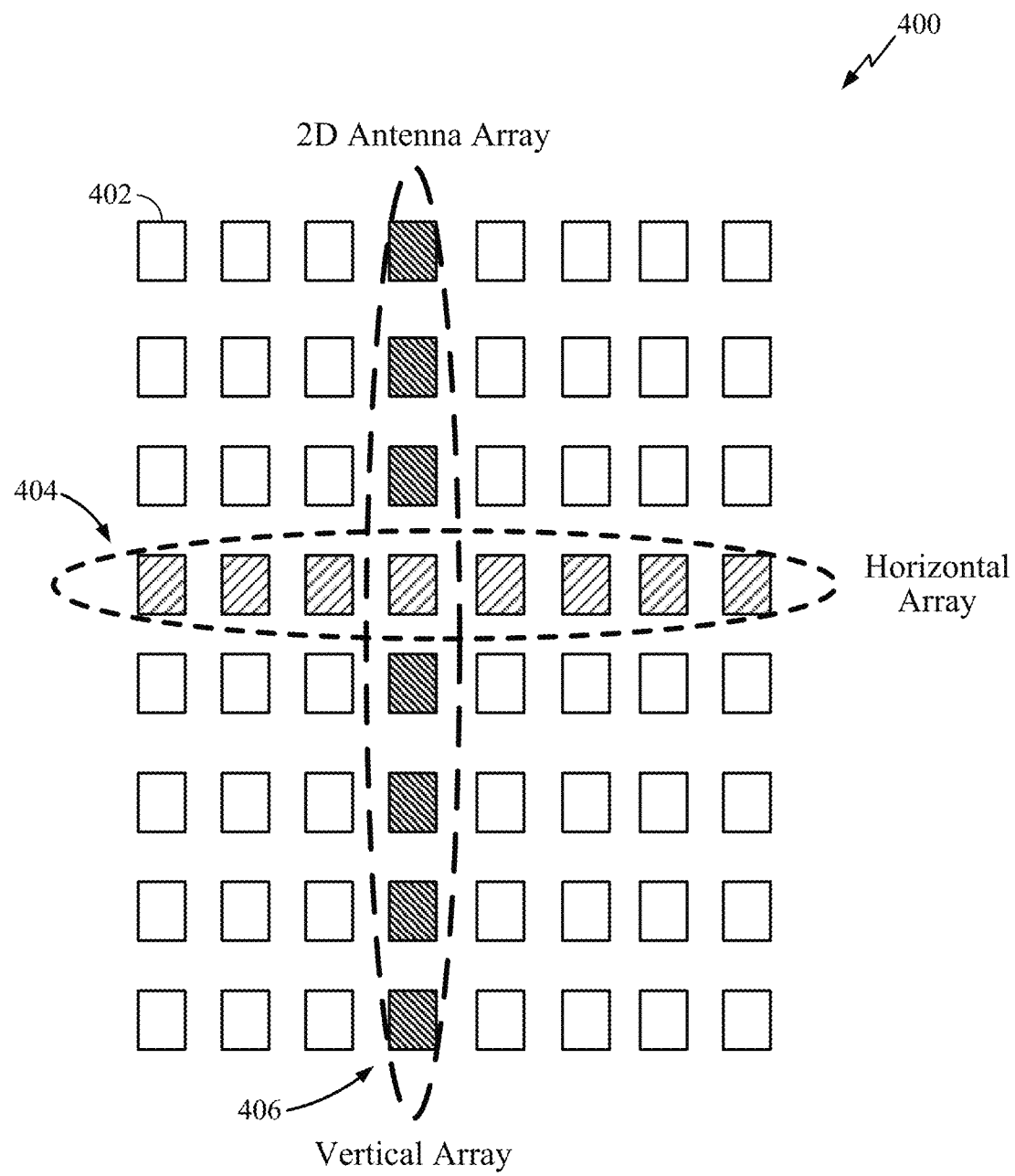
FIG. 4 illustrates an example of an antenna array that may be used for high dimension multiple-input multiple-out (MIMO) communications, in accordance with certain aspects of the present disclosure.

In certain systems, higher dimension 3D MIMO (as well as "lower dimension" 2D MIMO) systems have been discussed to enhance the peak data rate. As an example, in a 2D antenna array system with 64 antennas, it is possible to deploy a grid of 8×8 antennas on a 2D plane, as shown in FIG. 4. In this case, horizontal beamforming as well as vertical beamforming may used to exploit beamforming/SDMA gain both in azimuth and elevation. 8 antennas at the eNB, deployed in azimuth dimension only, allows SDMA or SU-MIMO in horizontal direction. Further inclusion of antennas in elevation, however, allows beamforming also in the vertical plane (e.g. to support different floors in a high rise building.

Example Periodic and Aperiodic Channel State Information Reporting

Certain aspects of the present disclosure provide mechanisms for using different parameters for configuring periodic and aperiodic channel state information (CSI) reporting. This may allow for reductions in feedback overhead for some CSI reporting.

In some MIMO systems, including 3D MIMO systems, the number of antenna ports that may be considered may be constrained by the form factor of a base station. In developing MIMO systems, developing antenna arrays that can perform three dimensional beamforming, which may allow for beamforming horizontally and vertically (i.e., in the azimuth and elevation dimensions), may be desirable. For example, a 2D antenna array with a larger number of antenna ports can be designed to allow for multi-user (MU) 3D MIMO.

Figure 5:
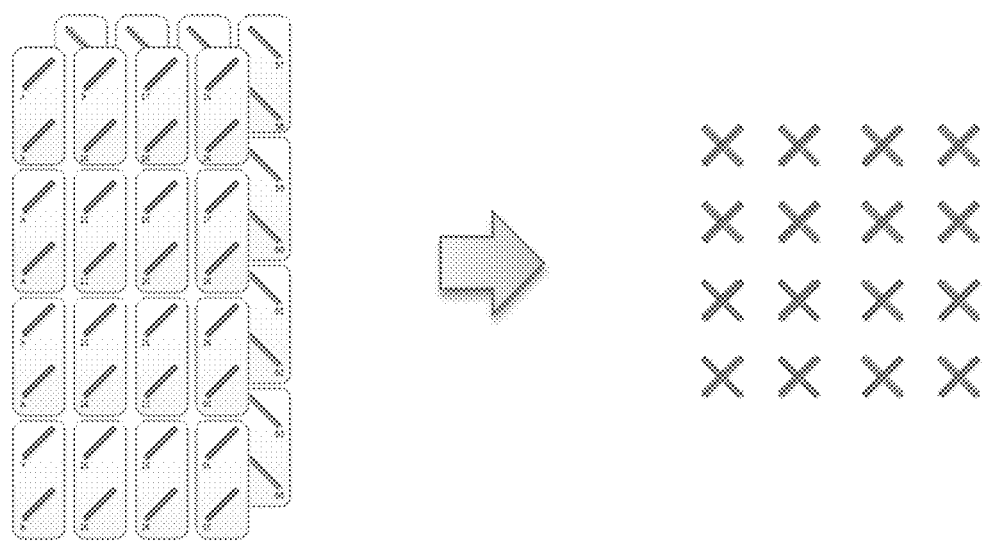
FIG. 5 illustrates an example of an antenna port structure in accordance with certain aspects of the present disclosure.

FIG. 5 illustrates an example 2D antenna port structure that may be used for 3D MIMO beamforming. The 2D antenna port structure can have eight antenna ports horizontally and four antenna ports vertically, resulting in a total of 32 antenna ports. Each antenna port may be formed from a two-element vertical sub-array. Such a sub-array may provide for directional antenna gain in the elevation domain.

Figure 6A:
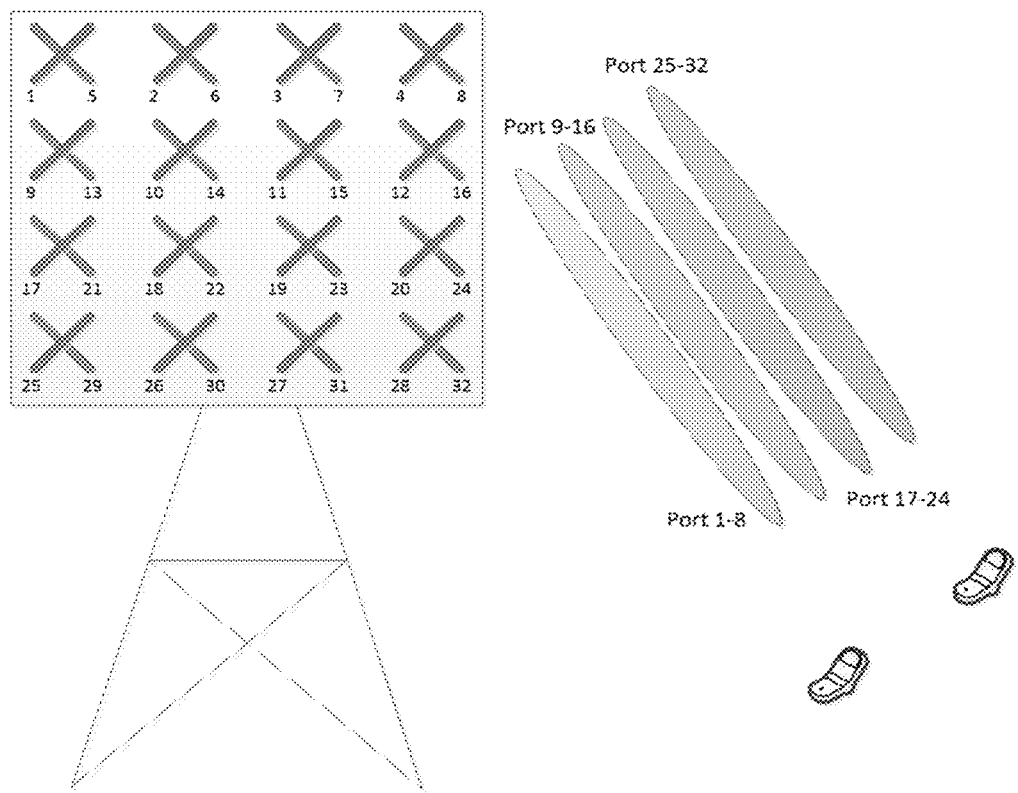
FIG. 6A illustrates an example of antenna port steering, in accordance with certain aspects of the present disclosure.
Figure 6B:
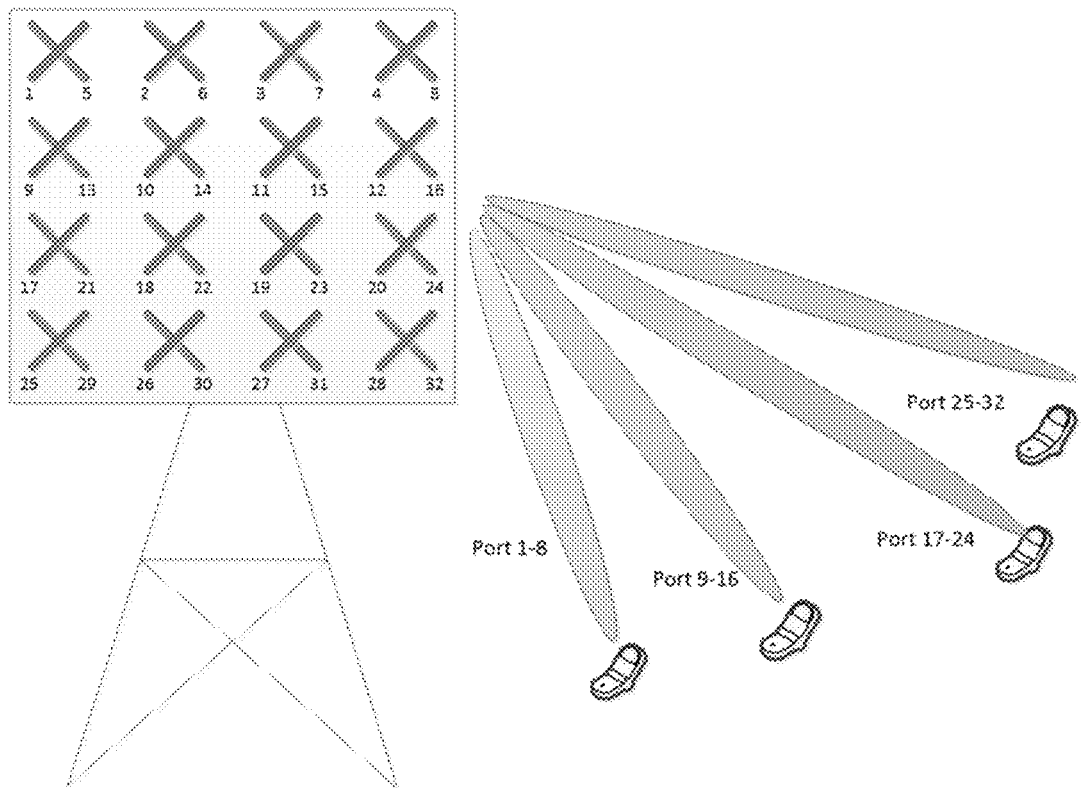
FIG. 6B illustrates an example of antenna port steering for multiple elevation domain subsectors in accordance with certain aspects of the present disclosure.

FIGS. 6A and 6B illustrates examples of steering antenna ports to support elevation beamforming and 3D MIMO. In one example, as illustrated in FIG. 6A, the antenna ports may be steered to the same direction in elevation. This steering may allow for flexible elevation beamforming and 3D MIMO operations. In another example, as illustrated in FIG. 6B, the elevation domain antennas may be steered to different directions. Steering the elevation domain antennas to different directions may allow for the formation of multiple elevation domain subsectors, which may be adapted depending on the location of users and the traffic load.

In large scale antenna systems, the number of channel responses that a terminal may need to estimate may be proportional to the number of transmission antenna ports. For implicit CSI feedback using a channel quality indicator (CQI), precoding matrix indicator (PMI), or rank indicator (RI), the complexity involved in determining a CSI report may increase exponentially with the number of antenna ports.

The uplink resources needed for CSI feedback may also scale with the number of antenna ports. However, because there may be a limitation on the total number of multiplexing bits (e.g., for periodic CSI feedback using PUCCH), CSI may be dropped if the amount of data exceeds the total number of multiplexing bits. For example, for PUCCH format 3, 22 bits may be used to multiplex HARQ-ACKs, scheduling request (SR) bits, and the channel state information, and if the total number of bits for HARQ-ACKs, SR, and CSI exceeds 22 bits, some information may be dropped.

However, in 3D-MIMO, not all antenna ports may be visible to a UE, and not all antenna ports may be received by a UE with the same signal strength depending on, for example, how the elevation antenna ports are mapped. However, reporting CSI for weak antenna ports may be meaningless. Further, for UEs that are close in proximity to a base station, beamforming with less antenna ports may achieve a sufficient beamforming gain and capacity. These UEs may not need provide CSI feedback for beamforming from all transmission antenna ports.

Thus, for 3D-MIMO and a large number of antenna ports, it may not be necessary for a 3D-MIMO capable UE to report CSI for all antenna ports. For example, it may be desirable for UE to not transmit periodic CSI feedback for all antenna ports using PUCCH.

Antenna selection may be applied for CSI measurement and feedback, for example, when a large antenna array is used at a base station for 3D MIMO transmissions.

In some cases, a BS may configure the CSI reporting mode to reduce CSI feedback overhead. For example, if a precoding matrix indicator (PMI) or rank indicator (RI) report (pmi-RI-Report) parameter is not configured for CSI reporting, a UE may report only transmission diversity channel quality indicator (TX Div CQI), assuming no precoding, and the UE need not report PMI and RI. Alternatively, the UE may feedback precoded CQI and antenna port number dependent PMI and/or RI to the eNB. These reporting modes imply that transmission beamforming may not be based on feedback from a UE if a pmi-RI-Report parameter is not configured for CSI reporting. Alternatively, a fewer number of antenna ports may be configured for CSI feedback, which may restrict the use of a large number of antenna ports for 3D MIMO.

To allow for the use of a large number of antenna ports in 3D MIMO, periodic and aperiodic CSI reporting may be configured with different CSI parameters. Periodic CSI reporting may provide limited CSI for large numbers of antenna ports for 3D MIMO operations, with some performance degradation, and aperiodic CSI reporting using PUSCH may provide full CSI for all configured antenna ports. Configuring periodic and aperiodic CSI reporting with different parameters may, for example, reduce periodic CSI feedback overhead on PUCCH. In some embodiments, the pmi-RI-Report parameter for 3D MIMO-capable UEs may be configured separately for periodic and aperiodic CSI reporting. For example, the pmi-RI-Report parameter may be configured for aperiodic CSI reporting using PUSCH but not configured for periodic CSI reporting using PUCCH. In some embodiments, 3D MIMO-capable UEs may be configured for periodic and aperiodic CSI reporting with different numbers of CSI-RS antenna ports. For example, the antenna ports configured for periodic CSI reporting may be a subset of the antenna ports configured for aperiodic CSI reporting. The subset may be configured by an eNB (e.g., using higher layer signaling) or autonomously by a UE.

Periodic CQI reporting using PUSCH may be configured with the same CSI reporting parameters used for configuring aperiodic CSI reporting.

Figure 7:
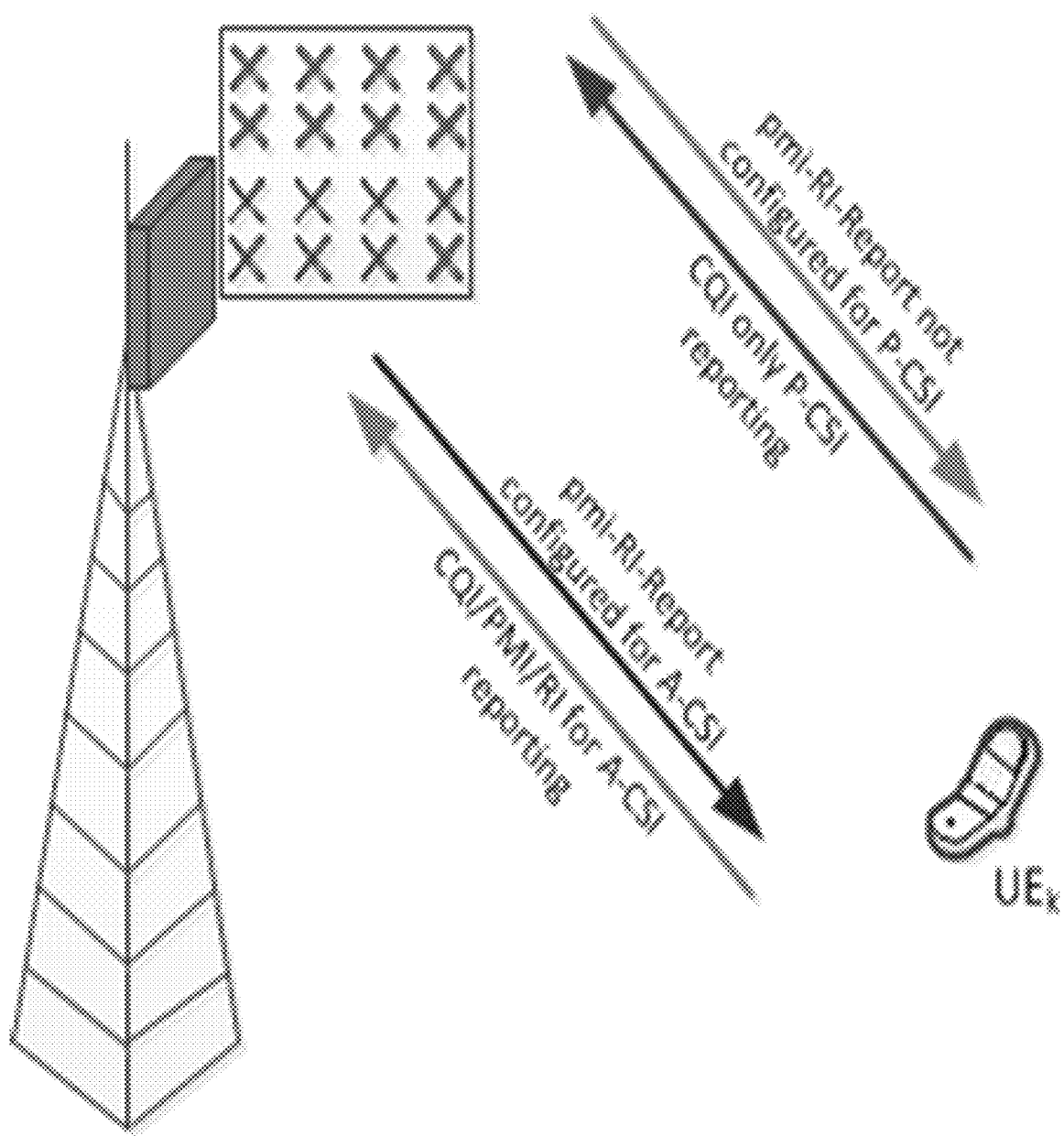
FIG. 7 illustrates an example of separate information reporting configurations for periodic and aperiodic channel state information (CSI) reporting, in accordance with certain aspects of the present disclosure.

FIG. 7 illustrates an example of separately configuring a pmi-RI-Report parameter for periodic and aperiodic CSI reporting. As illustrated, a UE can be configured with two pmi-RI-Report parameters. An example configuration may entail reporting CQI alone in periodic CSI reporting and reporting CQI, PMI, and RI in aperiodic reporting. Such a configuration may reduce the periodic CSI payload and may cause periodic CSI reporting to not be dependent on the number of CSI-RS antenna ports.

Configuring periodic and aperiodic CSI reporting with different parameters may, in some embodiments, entail the use of different antenna selections for periodic and aperiodic CSI reporting. Antenna selection for CSI feedback may be performed by either a base station or a UE. Regardless of whether antenna selection is performed by a base station or UE, the UE may be configured with a full set of CSI-RS antenna ports which may be used for aperiodic CSI reporting.

In an aspect, antenna selection performed by a base station may entail the following procedure. A BS may transmit a CSI measurement configuration message to a UE. The CSI measurement message may comprise a time-frequency resource configuration and a total number of CSI-RS antenna ports that may be used for aperiodic CSI measurement and reporting. Based on uplink received sounding reference signals (SRS), the BS can determine a subset of antenna ports for periodic CSI feedback for the UE. The UE may receive a message from the BS indicating the subset of antenna ports; for example, the message may comprise a bitmap of the antenna ports, where a value of "1" represents an antenna port that may be used for periodic CSI feedback and a value of "0" represents an antenna port that may not be used for periodic CSI feedback. The UE may perform channel measurement for the subset of antenna ports. Channel measurement may be performed by assuming that downlink data may be transmitted only from the subset of antenna ports, and CSI reporting may be generated by treating transmissions from antennas outside the subset (i.e., ports not used for periodic CSI feedback) as interference to the subset of antenna ports. Based on uplink measurements, the BS may update the subset of antenna ports selected for periodic CSI feedback.

Figure 8:
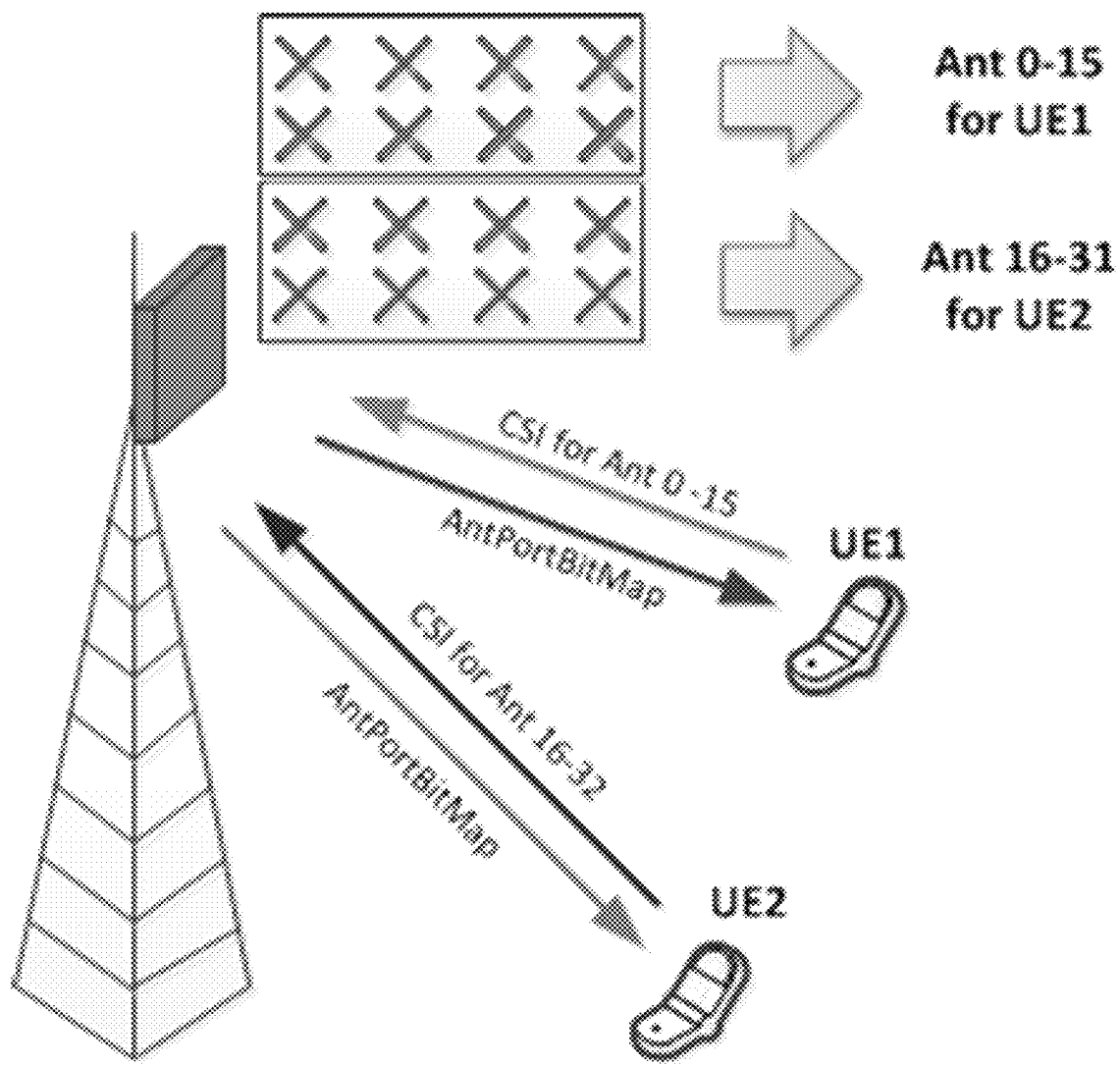
FIG. 8 illustrates an example of separate resource configurations for reporting channel state information (CSI) periodically and aperiodically, in accordance with certain aspects of the present disclosure.

FIG. 8 illustrates an example of antenna selection performed by a BS for configuring and performing periodic and aperiodic CSI reporting by a UE. A first UE may be configured to use a first set of antenna ports (e.g., antenna ports 0-15), and a second UE may be configured to use a second set of antenna ports (e.g., antenna ports 16-31) for periodic CSI reporting. The first and second UEs may feedback periodic CSI for the selected antenna ports. Based on CSI feedback and antenna port selection, the BS may perform user pairing and scheduling and may construct beamforming vectors for the base stations. For example, the BS may construct a beamforming vector for a first UE according to the equation:

$$W_1 = [W_{11} 0]^T$$

and a beamforming vector for a second UE according to the equation:

$$W_2 = [0 W_{22}]^T,$$

where $W_{11}$ and $W_{22}$ comprise precoding vectors determined from the periodic CSI reporting from the first and second UEs, respectively. For example, for a set of 32 antenna ports, $W_{11}$ and $W_{22}$ may each comprise 16×1 precoding vectors.

In an aspect, a UE may perform antenna selection for periodic and aperiodic CSI reporting. The UE receives a CSI measurement configuration from the BS, which may indicate the total number of CSI-RS antenna ports and a time-frequency resource configuration. The UE may measure received signal power for each antenna port and select a set of antenna ports based on these measurements. For example, for periodic CSI reporting, the UE may select a set of antenna ports with relatively strong received power measurements. The UE may report the measured CSI for the selected antenna ports and may also report to the BS an indication of the antenna port selection (e.g., a bitmap such as that described above).

Figure 9:
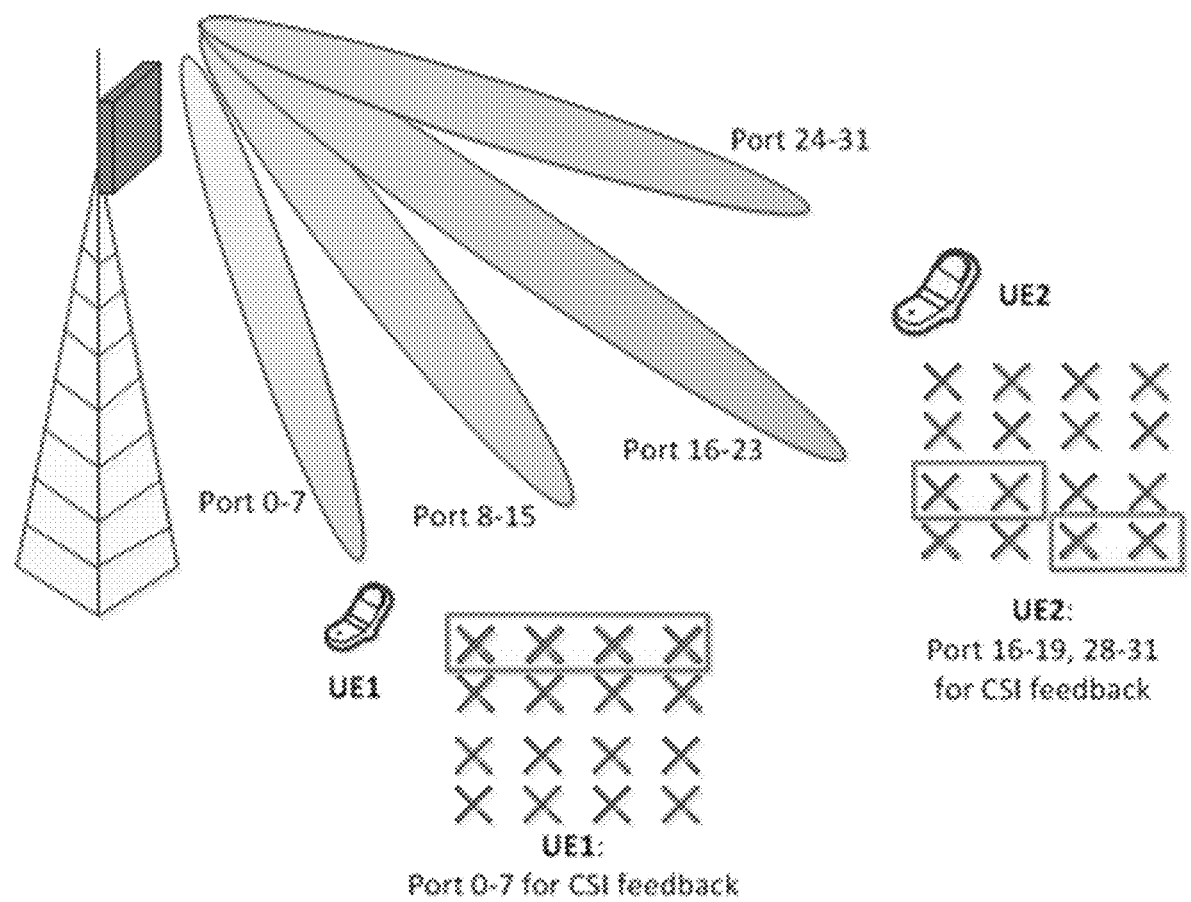
FIG. 9 illustrates another example of separate resource configurations for reporting CSI periodically and aperiodically, in accordance with certain aspects of the present disclosure.

FIG. 9 illustrates an example of antenna selection performed by a UE for configuring and performing periodic and aperiodic CSI reporting. A number of UEs may be configured with a total number of antenna ports. For example, as illustrated, a BS may have a total of 32 antenna ports and may use, for example, multiple elevation subvectors. A first UE may determine that a first set of ports have a strongest received signal power (e.g., ports 0-7) and select the first set of ports for periodic CSI reporting. A second UE may determine that a second set of ports have a strongest received signal power (e.g., ports 16-19 and 28-31) and select the second set of ports for periodic CSI reporting. The UEs may measure and report CSI, including CQI, PMI, and/or RI, of the selected antenna ports to the BS, as well as an indication of the antenna port selection.

Using a bitmap pattern for feedback of antenna port selection may be costly, as a bitmap pattern may entail the use of a large number of bits (for example, one bit for each antenna). It may be desirable to reduce the amount of resources used to signal antenna selection.

Further, codebooks associated with PMI may be determined by array structure. For example, discrete Fourier transform (DFT) based codebook may be used for closely spaced uniform linear array (ULA) structures.

If arbitrary antenna selection can be used for periodic CSI reporting, multiple codebook sets may need to be defined for different array structures. Defining multiple codebook sets may increase complexity. To minimize increases in complexity, it may be desirable to restrict antenna port selection for periodic CSI reporting.

Figure 10:
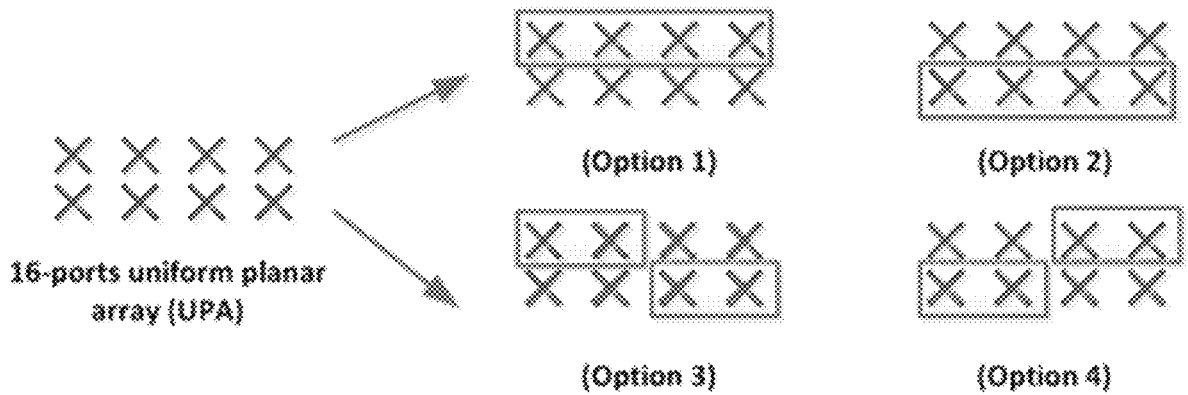
FIG. 10 illustrates examples of antenna selection options for reporting CSI periodically and aperiodically, in accordance with certain aspects of the present disclosure.

FIG. 10 illustrates an example of antenna selection options that may be used in a 16-port 2D uniform planar array (UPA). The antenna selection options may result in the 16-port UPA falling back to an 8-port ULA where a common codebook structure for the selected eight ports can be defined. Additionally, the UE need only provide feedback of the periodic CSI port selection, which may comprise a smaller number of bits than a bitmap representing the antenna selection. For example, for a 16-port antenna array and four port selection options, feedback of the port selection may comprise two bits rather than 16 bits.

In an embodiment, periodic CSI reportin configuration may entail single frequency network (SFN)-like precoding. SFN-like precoding may entail dividing the configured CSI-RS antenna ports into a number of antenna groups. For example, the antenna ports may be divided into groups by column or row of a 2D UPA. Each of the antenna groups may employ the same precoding, and a UE may select an antenna group by assuming that each antenna group uses the same precoding and selecting an antenna group based on the precoding. For example, UE k may report a common precoding matrix $W_k$ for the B antenna groups. The columns of $W_k$ may comprise the $L_k$ right singular vectors corresponding to the $L_k$ largest singular values of the composite channel:

$$\Sigma_{b=1}^{B} H_k^{(b)},$$

where $H_k^{(b)}$ represents the channel matrix of the $b^{th}$ antenna group.

Figure 11:
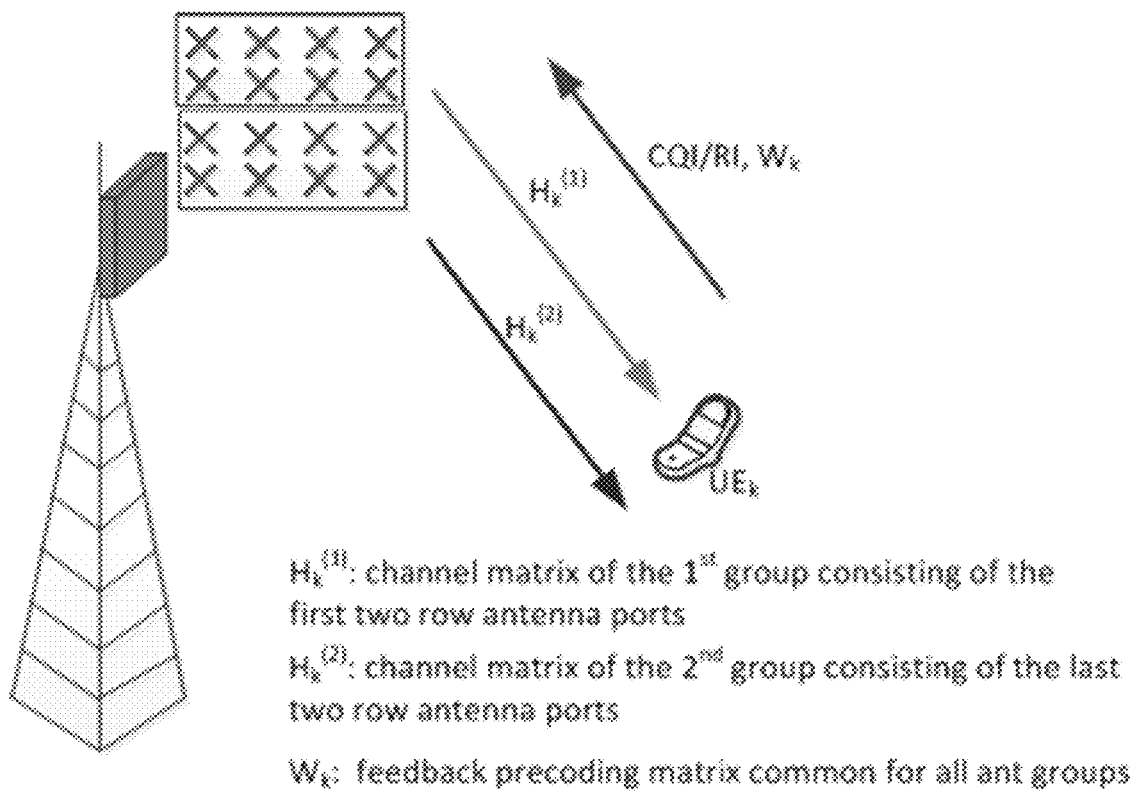
FIG. 11 illustrates an example of resource configuration for periodic CSI reporting, in accordance with certain aspects of the present disclosure.

FIG. 11 illustrates an example of SFN-like precoding for periodic CSI reporting. Two groups of antenna ports are shown; however, it may be recognized that a BS can configure any number of groups of antenna ports. When the BS receives feedback precoding matrices $W_k$, the BS may construct a transmission precoding vector $W^{(K)}$ for the antenna ports. For example, the transmission precoding vector for the two group example illustrated may be represented according to the equation:

$$W^{(k)} = \begin{bmatrix} W_k & 0 \\ 0 & W_k \end{bmatrix}.$$

The received signal may be represented according to the equation:

$$y_k = (\Sigma_{b=1}^{B} H_k^{(b)} W_k) x_k + n_k.$$

FIG. 12 illustrates an example structure for configuring CSI-RS resources. In this example, up to 8 non-zero power (NZP) CSI-RS antenna ports can be configured for each CSI-RS resource. The resourceConfig element may define the resource elements in the frequency domain that can be used for CSI-RS transmission, and the subframeConfig element may define the subframes in the time domain that can be used for CSI-RS. The antennaPortsCount element can be extended to support larger CSI-RS antenna port configurations. Extending the antennaPortsCount element may entail a change to the resourceConfig element, which may be restricted to a maximum of 8 port mappings to resource elements.

A composite CSI-RS resource with a large number of CSI-RS antenna ports can be constructed from multiple CSI-RS resources having a smaller number of CSI-RS antenna ports. FIG. 13 illustrates an example structure for configuring a larger number of CSI-RS ports. Multiple NZP-CSI-RS resources may be aggregated into an NZP-CSI-RS configuration. For example, as illustrated, to support a 16 CSI-RS port configuration, two NZP-CSI-RS resources (e.g., two sets of antennaPortsCount, resourceConfig, and subframeConfig elements) may be aggregated. FIG. 14 illustrates another example structure for configuring a larger number of CSI-RS ports. Multiple NZP-CSI-RS resources may be included in a CSI process.

Increasing the size of the NZP-CSI-RS configuration may cause PDSCH rate matching by legacy UEs (i.e., non-3D-MIMO-capable UEs) to not be performed correctly. Data puncturing may not provide good downlink performance if the reference signal overhead per resource block is large. In some embodiments, providing for successful PDCCH rate matching by legacy UEs may entail spreading CSI-RS ports to multiple subframes. Spreading CSI-RS ports across subframes may allow for the maintenance of a small reference signal overhead for each resource block. For example, spreading CSI-RS ports to multiple subframes may be performed such that the overhead is less than or equal to 8 resource elements, per resource block, per subframe to provide for an acceptable performance impact on legacy UEs. In some embodiments, configuration of a zero power (ZP) CSI-RS resource can include the resources reserved for NZP-CSI-RS ports not configured for use by legacy UEs.

Figure 15:
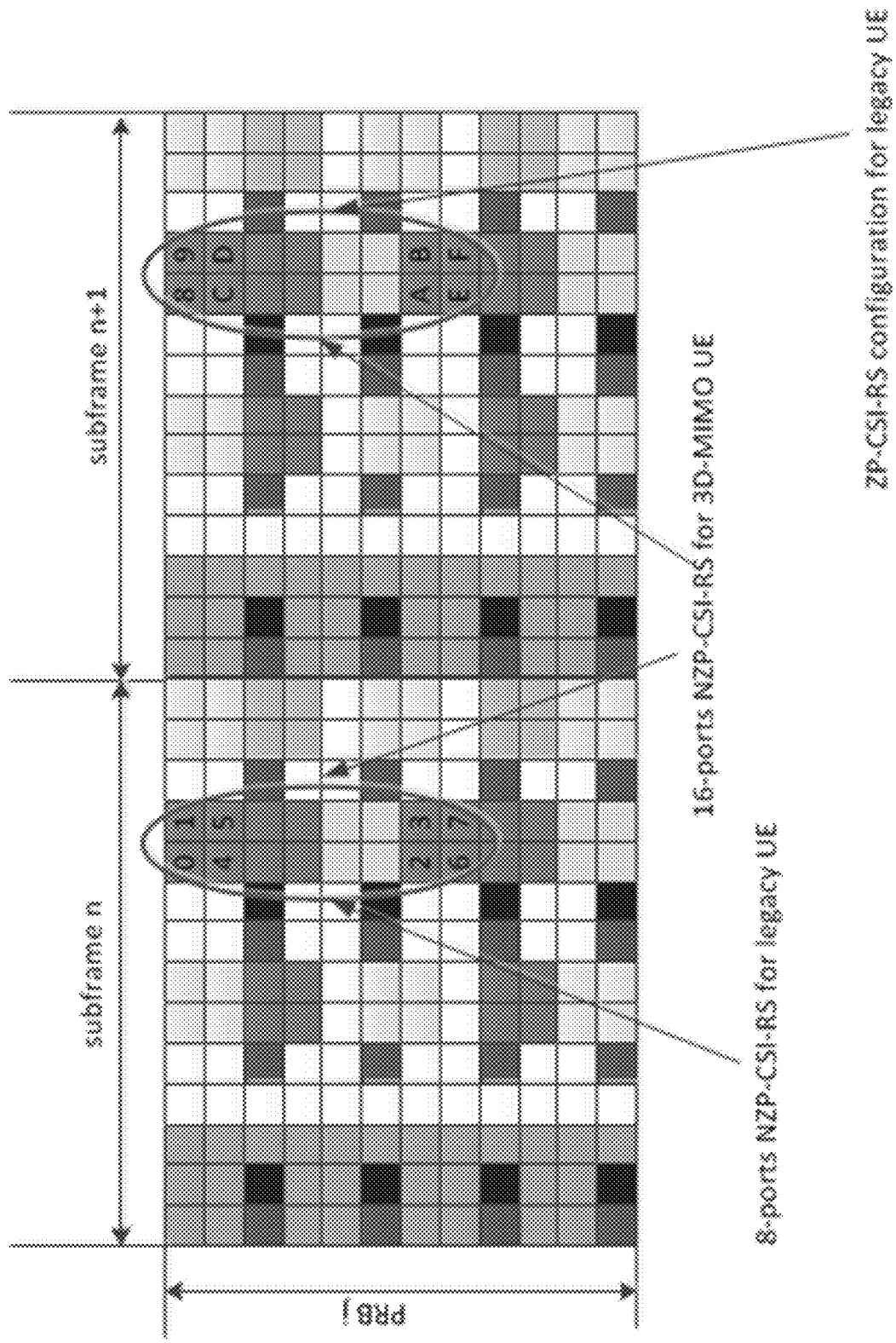
FIG. 15 illustrates an example resource configuration for legacy and 3D-MIMO-capable UEs, in accordance with certain aspects of the present disclosure.

FIG. 15 illustrates an example NZP-CSI-RS configuration for a 16 port NZP-CSI-RS configuration. In subframe n, legacy and 3D MIMO UEs can share the same NZP-CSI-RS resources. In subframe n+1, the NZP-CSI-RS resources for 3D MIMO UEs can overlap with the ZP-CSI-RS resources for legacy UEs. Thus, legacy UEs can correctly perform PDSCH rate matching around the 16 port configuration for 3D MIMO UEs.

Figure 16:
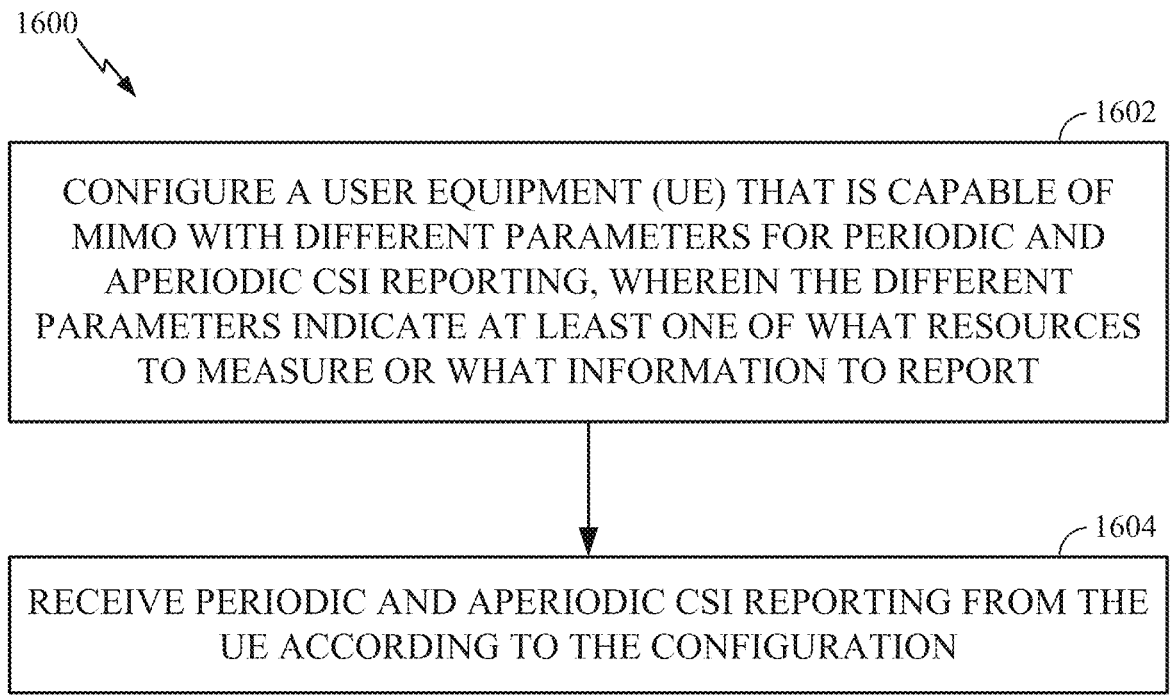
FIG. 16 illustrates example operations that may be performed by a base station, in accordance with certain aspects of the present disclosure.

FIG. 16 illustrates example operations 1600 that may be performed by a base station (e.g., an eNodeB) to provide for reductions in overhead for CSI reporting, in accordance with aspects of the present disclosure. Operations 1600 may begin at 1602, where a BS configures a UE that is capable of 3D MIMO with different parameters for periodic and aperiodic CSI reporting, wherein the different parameters indicate at least one of what resources to measure or what information to report. At 1604, the BS receives periodic and aperiodic CSI reporting from the UE according to the configuration.

Figure 17:
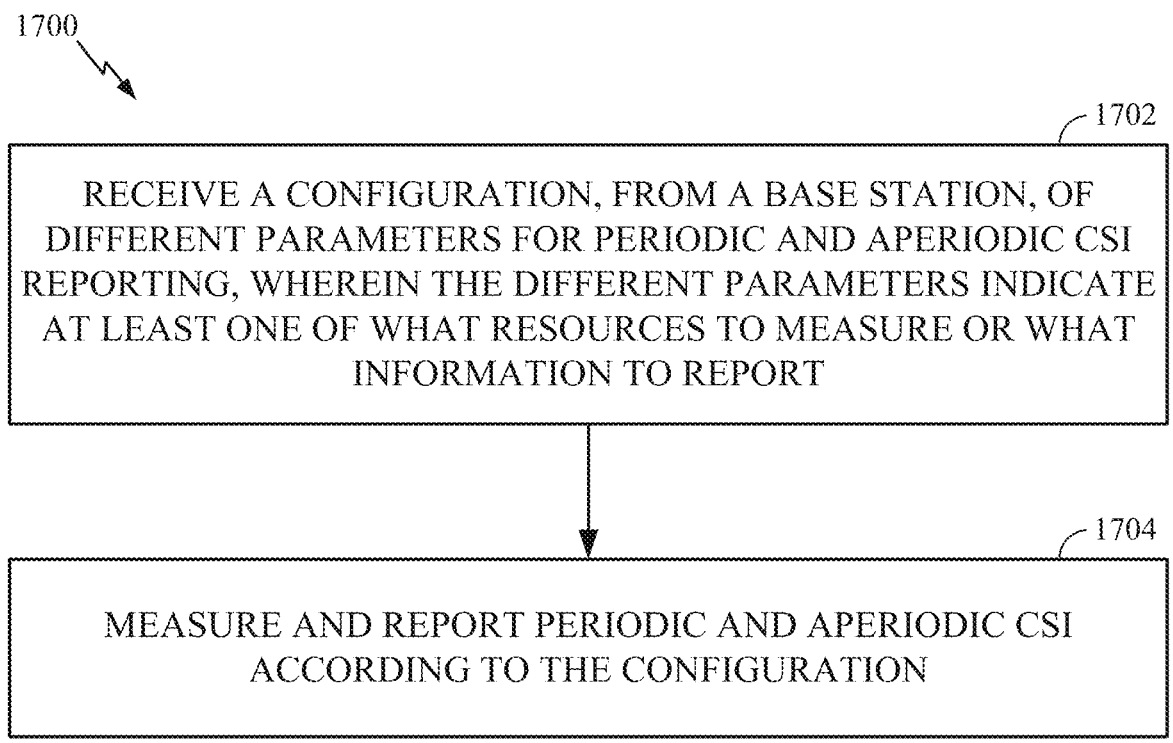
FIG. 17 illustrates example operations that may be performed by a user equipment, in accordance with certain aspects of the present disclosure.

FIG. 17 illustrates example operations 1700 that may be performed by a user equipment to provide for reductions in overhead for CSI reporting, in accordance with aspects of the present disclosure. Operations 1700 may begin at 1702, where a UE receives a configuration, from a BS, of different parameters for periodic and aperiodic CSI reporting, wherein the different parameters indicate at least one of what resources to measure or what information to report. At 1704, the UE measures and reports periodic and aperiodic CSI according to the configuration.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communications by a user equipment (UE) capable of MIMO, comprising:
    receiving a configuration, from a base station, that includes a set of parameters for periodic and aperiodic channel state information (CSI) reporting, wherein the set of parameters comprise an indication of at least one of what resources to measure or what information to report, wherein the configuration comprises a configuration for a composite resource constructed from a plurality of CSI-RS resources configured for measuring and reporting CSI, wherein the set of parameters comprises a first set of information for periodic CSI reporting and a second set of information for aperiodic CSI reporting, wherein the first set of information is different than the second set of information, wherein the composite resource includes a first number of CSI-RS ports, wherein each of the plurality of CSI-RS resources includes a second number of CSI-RS ports, and wherein the first number of CSI-RS ports is greater than the second number of CSI-RS ports; and
    measuring and reporting periodic and aperiodic CSI according to the configuration.

2. The method of claim 1, wherein the UE is capable of 3D MIMO with more than 8 antenna ports.

3. The method of claim 1, wherein:
    the second set of information, but not the first set of information, comprises precoding matrix indicator (PMI) and rank indication (RI) information.

4. The method of claim 3, wherein:
    the second set of information comprises PMI and RI information when CSI is reported aperiodically using a physical uplink shared channel (PUSCH); and
    the first set of information does not comprise PMI and RI information when CSI is reported periodically using a physical uplink control channel (PUCCH).

5. The method of claim 1, wherein the set of parameters comprise:
    a first set of antenna ports for measuring and reporting CSI aperiodically; and
    a second set of antenna ports for measuring and reporting CSI periodically.

6. The method of claim 5, wherein the second set of antenna ports comprises a subset of the first set of antenna ports.

7. The method of claim 5, further comprising receiving signaling, from the base station, indicating the first set of antenna ports and the second set of antenna ports.

8. The method of claim 5, further comprising:
    receiving an initial configuration of available antenna ports; and
    providing the base station an indication of a selection of a subset of the available antenna ports based on received signal measurements for the antenna ports.

9. The method of claim 8, wherein the indication comprises a bitmap indicating selected antenna ports, wherein the bitmap comprises fewer bits than a number of available antenna ports or a precoding matrix indicating selected antenna ports, wherein the indication comprises an indication for selecting one of a plurality of pre-defined antenna port selection options.

10. The method of claim 1, wherein the composite resource comprises a subset of a set of configured CSI-RS resources.

11. The method of claim 1, wherein the first number of CSI-RS ports comprises more than 8 CSI-RS ports and wherein the second number of CSI-RS ports is less than the first number of CSI-RS ports.

12. The method of claim 1, wherein the first number of CSI-RS ports comprises more than 32 CSI-RS ports and wherein the second number of CSI-RS ports comprises 16 CSI-RS antenna ports.

13. The method of claim 1, wherein the first number of CSI-RS ports comprises an aggregation of the second number of CSI-RS ports of each of the plurality of CSI-RS resources.

14. An apparatus for wireless communications by a user equipment (UE) capable of MIMO, comprising:
    memory having executable instructions stored thereon; and
    one or more processors configured, individually or collectively, to execute the executable instructions and cause the apparatus to:
        receive a configuration, from a base station, that includes a set of parameters for periodic and aperiodic channel state information (CSI) reporting, wherein the set of parameters comprise an indication of at least one of what resources to measure or what information to report, wherein the configuration comprises a configuration for a composite resource constructed from a plurality of CSI-RS resources configured for measuring and reporting CSI, wherein the set of parameters comprises a first set of information for periodic CSI reporting and a second set of information for aperiodic CSI reporting, wherein the first set of information is different than the second set of information, wherein the composite resource includes a first number of CSI-RS ports, wherein each of the plurality of CSI-RS resources includes a second number of CSI-RS ports, and wherein the first number of CSI-RS ports is greater than the second number of CSI-RS ports; and measure and reporting periodic and aperiodic CSI according to the configuration.

15. The apparatus of claim 14, wherein the UE is capable of 3D MIMO with more than 8 antenna ports.

16. The apparatus of claim 14, wherein:
the second set of information, but not the first set of information, comprises precoding matrix indicator (PMI) and rank indication (RI) information.

17. The apparatus of claim 16, wherein:
the second set of information comprises PMI and RI information when CSI is reported aperiodically using a physical uplink shared channel (PUSCH); and
the first set of information does not comprise PMI and RI information when CSI is reported periodically using a physical uplink control channel (PUCCH).

18. The apparatus of claim 14, wherein the set of parameters comprise:
a first set of antenna ports for measuring and reporting CSI aperiodically; and
a second set of antenna ports for measuring and reporting CSI periodically.

19. The apparatus of claim 18, wherein the second set of antenna ports comprises a subset of the first set of antenna ports.

20. The apparatus of claim 18, wherein the one or more processors are further configured to cause the apparatus to receive signaling, from the base station, indicating the first set of antenna ports and the second set of antenna ports.

21. The apparatus of claim 18, wherein the one or more processors are further configured to cause the apparatus to:
receive an initial configuration of available antenna ports; and
provide the base station an indication of a selection of a subset of the available antenna ports based on received signal measurements for the antenna ports.

22. The apparatus of claim 21, wherein the indication comprises a bitmap indicating selected antenna ports, wherein the bitmap comprises fewer bits than a number of available antenna ports or a precoding matrix indicating selected antenna ports, wherein the indication comprises an indication for selecting one of a plurality of pre-defined antenna port selection options.

23. The apparatus of claim 14, wherein the composite resource comprises a subset of a set of configured CSI-RS resources.

24. The apparatus of claim 14, wherein the first number of CSI-RS ports comprises more than 8 CSI-RS ports and wherein the second number of CSI-RS ports is less than the first number of CSI-RS ports.

25. An apparatus for wireless communications by a user equipment (UE) capable of MIMO, comprising:
means for receiving a configuration, from a base station, that includes a set of parameters for periodic and aperiodic channel state information (CSI) reporting, wherein the set of parameters comprise an indication of at least one of what resources to measure or what information to report, wherein the configuration comprises a configuration for a composite resource constructed from a plurality of CSI-RS resources configured for measuring and reporting CSI, wherein the set of parameters comprises a first set of information for periodic CSI reporting and a second set of information for aperiodic CSI reporting, wherein the first set of information is different than the second set of information, wherein the composite resource includes a first number of CSI-RS ports, wherein each of the plurality of CSI-RS resources includes a second number of CSI-RS ports, and wherein the first number of CSI-RS ports is greater than the second number of CSI-RS ports; and
means for measuring and reporting periodic and aperiodic CSI according to the configuration.

26. The apparatus of claim 25, wherein the UE is capable of 3D MIMO with more than 8 antenna ports.

27. The apparatus of claim 25, wherein:
the second set of information, but not the first set of information, comprises precoding matrix indicator (PMI) and rank indication (RI) information.

28. The apparatus of claim 27, wherein:
the second set of information comprises PMI and RI information when CSI is reported aperiodically using a physical uplink shared channel (PUSCH); and
the first set of information does not comprise PMI and RI information when CSI is reported periodically using a physical uplink control channel (PUCCH).

29. The apparatus of claim 25, wherein the composite resource comprises a subset of a set of configured CSI-RS resources.

30. The apparatus of claim 29, wherein the indication comprises a bitmap indicating selected antenna ports, wherein the bitmap comprises fewer bits than a number of available antenna ports or a precoding matrix indicating selected antenna ports, wherein the indication comprises an indication for selecting one of a plurality of pre-defined antenna port selection options.

* * * * *